(12) United States Patent
Shen (10) Patent No.: US 9,248,750 B2
(45) Date of Patent: Feb. 2, 2016

(54) VEHICULAR CHARGER

(71) Applicant: NINGBO TALLER ELECTRICAL APPLIANCE CO., LTD, Yuyao, Zhejiang Province (CN)

(72) Inventor: Jianli Shen, Yuyao (CN)

(73) Assignee: NINGBO TALLER ELECTRICAL APPLIANCE CO., LTD, Yuyao, Zhejiang Province (CN)

( * ) Notice: Subject to any disclaimer, the term of this patent is extended or adjusted under 35 U.S.C. 154(b) by 225 days.

(21) Appl. No.: 14/078,541

(22) Filed: Nov. 13, 2013

(65) Prior Publication Data

US 2015/0054448 A1    Feb. 26, 2015

(30) Foreign Application Priority Data

Aug. 21, 2013   (CN) .......................... 2013 1 0367697

(51) Int. Cl.
  *H02J 7/00* (2006.01)
  *B60L 11/00* (2006.01)
  *B60L 11/18* (2006.01)

(52) U.S. Cl.
  CPC ........... *B60L 11/1818* (2013.01); *H02J 7/0044* (2013.01)

(58) Field of Classification Search
  CPC ........................... H02J 7/0044; B60L 11/1818

USPC ............................ 320/107, 112, 14, 115, 114
See application file for complete search history.

(56) References Cited

U.S. PATENT DOCUMENTS

| | | | |
|---|---|---|---|
| 2003/0137196 | A1* | 7/2003 | Liran .............................. 307/64 |
| 2006/0192527 | A1* | 8/2006 | Kageler et al. ................ 320/115 |
| 2006/0261778 | A1* | 11/2006 | Elizalde Rodarte .......... 320/114 |
| 2013/0342162 | A1* | 12/2013 | Tabata et al. .................. 320/108 |
| 2014/0091758 | A1* | 4/2014 | Hidaka et al. ................. 320/108 |
| 2014/0339895 | A1* | 11/2014 | Miklitsch ........................ 307/31 |
| 2015/0032177 | A1* | 1/2015 | Mashiach et al. .............. 607/42 |
| 2015/0044549 | A1* | 2/2015 | Tutunaru ....................... 429/188 |
| 2015/0290465 | A1* | 10/2015 | Mashiach ............ A61N 1/0558 607/61 |

* cited by examiner

*Primary Examiner* — Phallaka Kik
(74) *Attorney, Agent, or Firm* — Brian S. Boyer; Syndicated Law, PC (57) ABSTRACT

A vehicular charger is provided with a main casing body and a secondary casing body; a chargeable source part inside the main casing body; a circuit board electrically connected to the chargeable source part; an interface on the circuit board; an illumination assembly inside the secondary casing body and charged by the chargeable source part; a switch for controlling the ON/OFF of the illumination assembly on the circuit board; a magnet is mounted on the secondary casing body. The vehicular charger is useful, for example, in the home, office, and during travel, in which a buckle can be used to carry the charger, an LED light can be used to illuminate, and the interface can be used for charging or interfacing the charger with other electronic devices.

6 Claims, 7 Drawing Sheets

VEHICULAR CHARGER

CROSS-REFERENCE TO RELATED APPLICATIONS

This application claims the benefit of Chinese Application No 201310367697.1, filed Aug. 21, 2013, which is hereby incorporated herein by reference in its entirety.

BACKGROUND

1. Field of the Invention

This invention relates to a charging device, and especially to a multifunctional vehicular charger.

2. Description of the Related Art

A charging device usually includes a standard charger exclusive to an electronic device as well as an additionally arranged charging device, where those charging devices have a charging cradle, a movable charger etc. The charging cradle is usually used in home or in the company, and is inconvenient to carry. Usually, a movable charging device is suitable for being carried when the user is traveling or is in office. The existing movable charger is huge, and is always be kept in the bag when it is not used; while it only has one function, which is charging an electronic device. With the development of the society, diversified and multifunctional products are getting more and more popular. Especially when people goes out, people always want to carry as little things as possible, while having as more functions as possible, and no matter it is a normal usage state or an emergent usage state, people's need for usage can be fulfilled.

SUMMARY OF THE INVENTION

(1). Technical Problem to be Solved

An object of the present invention is to provide a portable vehicular charger with multiple function with respect to these technical problems as existing in the prior art.

(2). Technical Solutions

In order to solve said technical problem, a vehicular charger of the present invention comprises a main casing body and a secondary casing body which is arranged on both radial side of the main casing body and is rotatable matched with the main casing body; a chargeable source part is provided inside said main casing body; a circuit board electrically connected to the chargeable source part is arranged on one end face of said main casing body; an interface is arranged on the circuit board; an illumination assembly is mounted inside said secondary casing body; the illumination assembly is charged by the chargeable source part; a switch for controlling the ON/OFF of the illumination assembly is provided on said circuit board; a magnet is mounted on said secondary casing body.

Preferably, a terminal cover embedded into the main casing body is mounted on one end face of said main casing body; an outer cover clamped and fixed with the main casing body is arranged outside the terminal cover; one side of said outer cover is provided with an elastic L-shaped clamping arm integrated formed with said outer cover; a buckle clamped by the clamping arm is provided on the outer cover; a compressing cover clamped by the clamping arm is screwed and fixed on said outer cover; the compressing cover can adjust clamping force of the clamping arm.

Preferably, said secondary casing body includes a main body rotatable matched with the main casing body as well as an upper cover mounted on the main body; a mounting slot is provided on said main body; said magnet is arranged inside the mounting slot.

Preferably, said main casing body is provided with a guiding plate; the guiding plate surrounds on outer wall of the main casing body; said guiding plate is arranged in two layers with an interval along axial direction of the main casing body, and a guiding slot is formed between those two layers; a curved guiding block that can be embedded into the guiding slot is provided on said main body; said main body can make rotation movements along the guiding slot.

Preferably, said secondary casing body also include a sealing cover which is clamped by and fixed to the main body; the sealing cover is also provided with a guiding block which rotate along the guiding slot; outer wall of said main casing body is provided with a limit plate; the limit plate is correspondingly arranged on outer walls on both sides of the main casing body; said sealing cover is provided with a limit block; the limit block is located between two corresponding limit plates; when the sealing cover rotates to a limited position, the limit block is put against the limit plate, and the limit plate stops the movement of the limit block.

Preferably, said illumination assembly includes a substrate and a LED light arranged on the substrate; a light sleeve on said substrate, a transparent cover is arranged inside the light sleeve; a bracket sleeve on said substrate, said bracket sleeve and said secondary casing body are screwed to be fixed together.

(3). Technical Effects

The vehicular charger of the present invention is not only suitable for being used at home, but also in office; and it also is suitable for being used during trip or out of office. Especially during outdoor travel, the user can use the buckle to carry the product of the present invention. Moreover, during night activities, the LED light can be used to illuminate, so as to bring convenience to the user. Further, the interface of the present invention includes a interface dedicated to charge the chargeable source part, and a USB interface for supplying other electronic devices.

In these figures, 1 indicates a main casing body, 2 indicates a secondary casing body, 3 indicates a chargeable source part, 4 indicates a circuit board, 5 indicates a charging interface, 6 indicates a USB interface, 7 indicates an illumination assembly, 8 indicates a switch, 9 indicates a magnet, 10 indicates a main body, 11 indicates an upper cover, 12 indicates a mounting slot, 13 indicates a terminal cover, 14 indicates an outer cover, 15 indicates a clamping arm, 16 indicates a buckle, 17 indicates a compressing cover, 18 indicates a guiding plate, 19 indicates a guiding slot, 20 indicates a sealing cover, 21 indicates a guiding block, 22 indicates a limit plate, 23 indicates a limit block, 24 indicates a substrate, 25 indicates a LED light, 26 indicates a light sleeve, 27 indicates a transparent cover, and 28 indicates a bracket sleeve.

DETAILED DESCRIPTION OF THE PREFERRED EMBODIMENTS

In the following, the vehicular charger of the present invention is further explained in connection with the figures.

Embodiment 1

As shown in FIGS. 1 to 7, the vehicular charger of the present invention, which comprises a main casing body 1 and a secondary casing body 2 which is arranged on both radial side of the main casing body 1 and is rotatable matched with the main casing body 1; a chargeable source part 3 is provided inside said main casing body 1; the chargeable source part 3 can be a rechargeable battery, and also can be a rechargeable lithium battery; a circuit board 4 electrically connected to the chargeable source part 3 is arranged on one end face of said main casing body 1; an interface is arranged on the circuit board 4; said interface has two kinds in total, one of which is a charging interface 5 for charging the chargeable source part 3, and the other of which is a USB interface 6 for charging other electronic devices; an illumination assembly 7 is mounted inside said secondary casing body 2; the illumination assembly 7 is charged by the chargeable source part 3; a switch 8 for controlling the ON/OFF of the illumination assembly 7 is provided on said circuit board 4. Two secondary casing bodies 2 are arranged on both side of the main casing body 1 of the embodiment and are rotatable matched with the main casing body 1; each secondary casing body 2 is provided with one illumination assembly 7. Said switch 8 includes two independent switches 8, enabling individually controlling of those two illumination assemblies 7, so as to fulfill the people's usage requirements. A magnet 9 is mounted on said secondary casing body 2; said secondary casing body 2 includes a main body 10 rotatable matched with the main casing body 1 as well as an upper cover 11 mounted on the main body 10. A mounting slot 12 is provided on said main body 10. Said magnet 9 is arranged inside the mounting slot 12. When a user opens the illumination assembly 7 so as to apply priming illumination onto an object, the magnet 9 arranged on the secondary casing body 2 can be used to absorb the vehicular charger of the embodiment onto a ferromagnetic object; thus, the user can release his/her hands for operation as needed.

A terminal cover 13 embedded into the main casing body 1 is mounted on one end face of said main casing body 1. An outer cover 14 clamped and fixed with the main casing body 1 is arranged outside the terminal cover 13. One side of said outer cover 14 is provided with an elastic L-shaped clamping arm 15 integrated formed with said outer cover 14. A buckle 16 clamped by the clamping arm 15 is provided on the outer cover 14. A compressing cover 17 clamped by the clamping arm 15 is screwed and fixed on said outer cover 14; the compressing cover 17 can adjust clamping force of the clamping arm 15; one end of the main casing body 1 is provided with a buckle 16, for the user to carry to the outside.

Said main casing body 1 is provided with a guiding plate 18; the guiding plate 18 surrounds on outer wall of the main casing body 1; said guiding plate 18 is arranged in two layers with an interval along axial direction of the main casing body 1, and a guiding slot 19 is formed between those two layers. A curved guiding block 21 that can be embedded into the guiding slot 19 is provided on said main body 10. Said main body 10 can make rotation movements along the guiding slot 19; said secondary casing body 2 also include a sealing cover 20 which is clamped by and fixed to the main body 10; the sealing cover 20 is also provided with a guiding block 21 which can rotate along the guiding slot 1. Outer wall of said main casing body 1 is provided with a limit plate 22; the limit plate 22 is correspondingly arranged on outer walls on both sides of the main casing body 1. Said sealing cover 20 is provided with a limit block 23; the limit block 23 is located between two corresponding limit plates 22; when the sealing cover 20 rotates to a limited position, the limit block 23 is put against the limit plate 22, and the limit plate 22 stops the movement of the limit block 23. During movement, the secondary casing body 2 enables an "open" state or a "closed" state; the combined usage of the limit plate 22 and the limit block 23 can make the secondary casing body 2 to take a rotation movement with a rotation angle of 90°. When two secondary casing bodies 2 are in open state, an extended angle of 180° is formed, thus, the illumination assembly 7 can be used to illuminate other objects; when the illumination is finished, the user can furl the secondary casing body 2, thus, not only the illumination assembly 7 can be protected, but also less space will be occupied, realizing the goal of reducing the vehicular charger, so that it is more convenient to carry.

Figure 1:
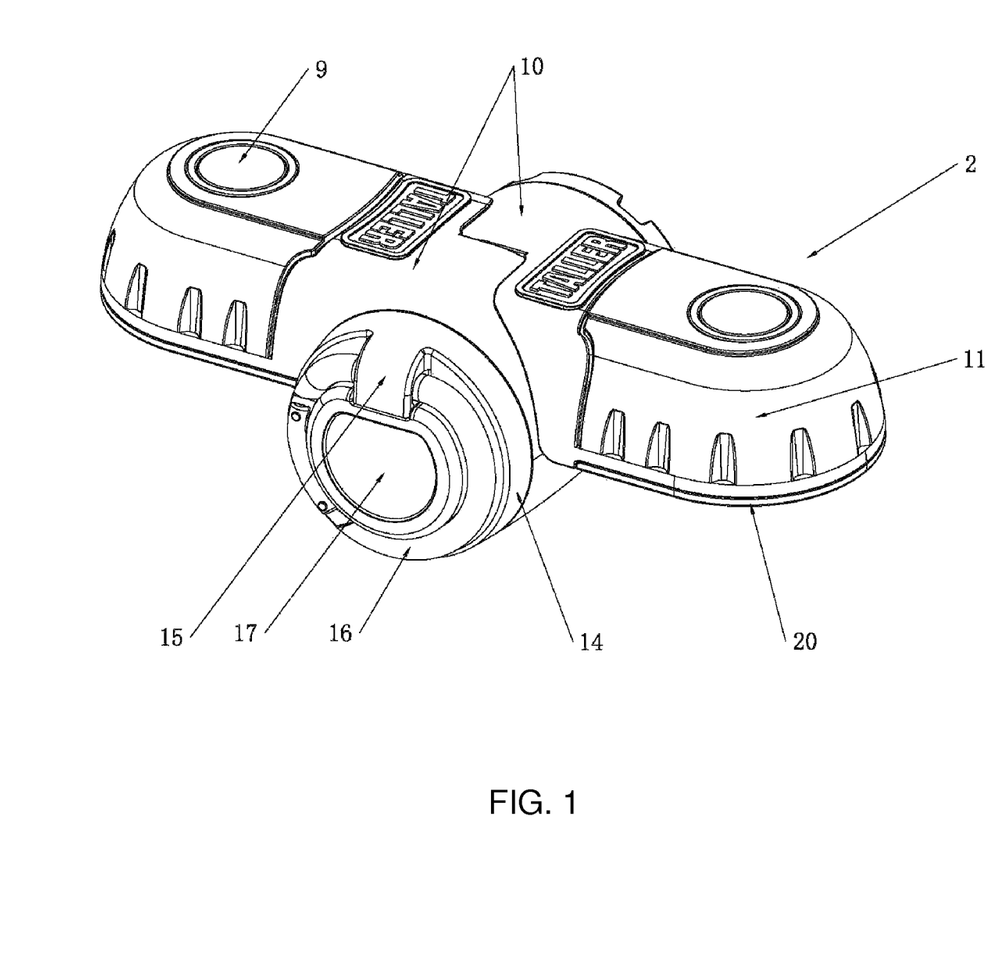
FIG. 1 is a first three-dimensional structure diagram of a vehicular charger of the present invention.
Figure 2:
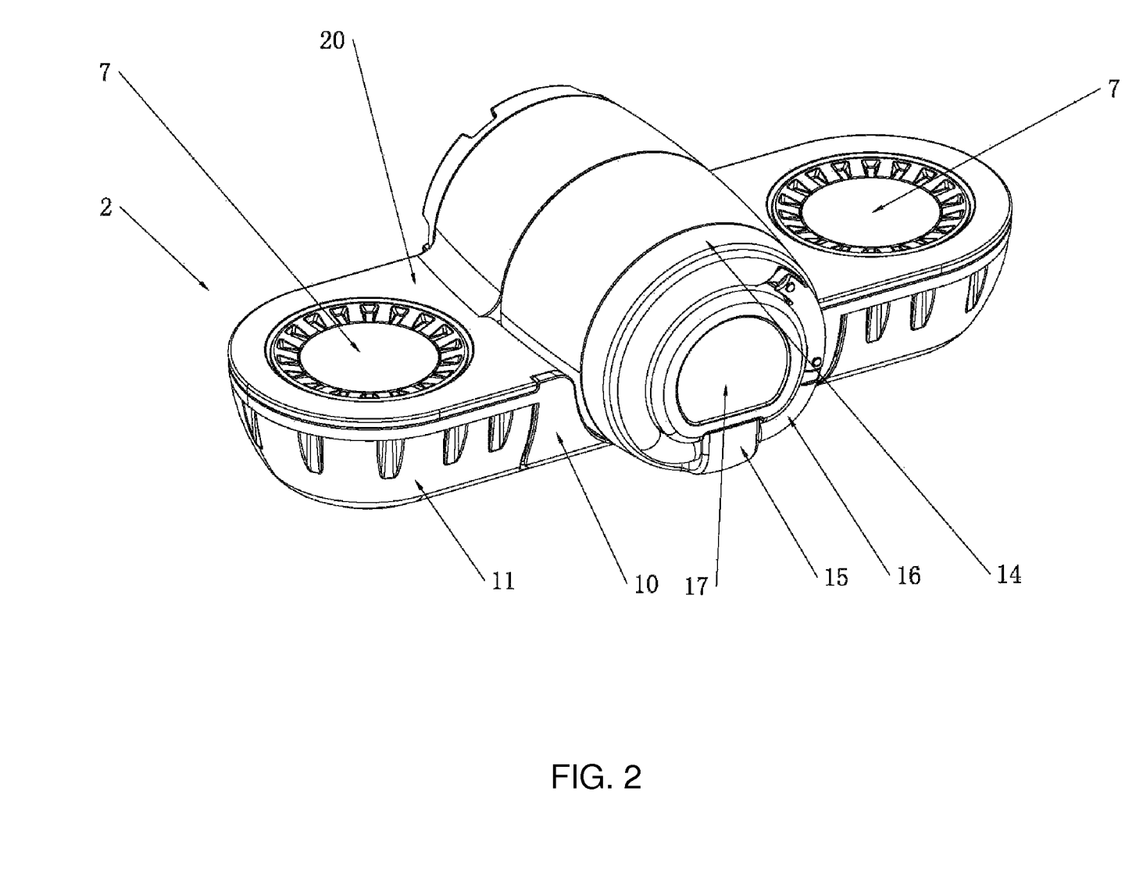
FIG. 2 is a second three-dimensional structure diagram of the vehicular charger of the present invention.
Figure 3:
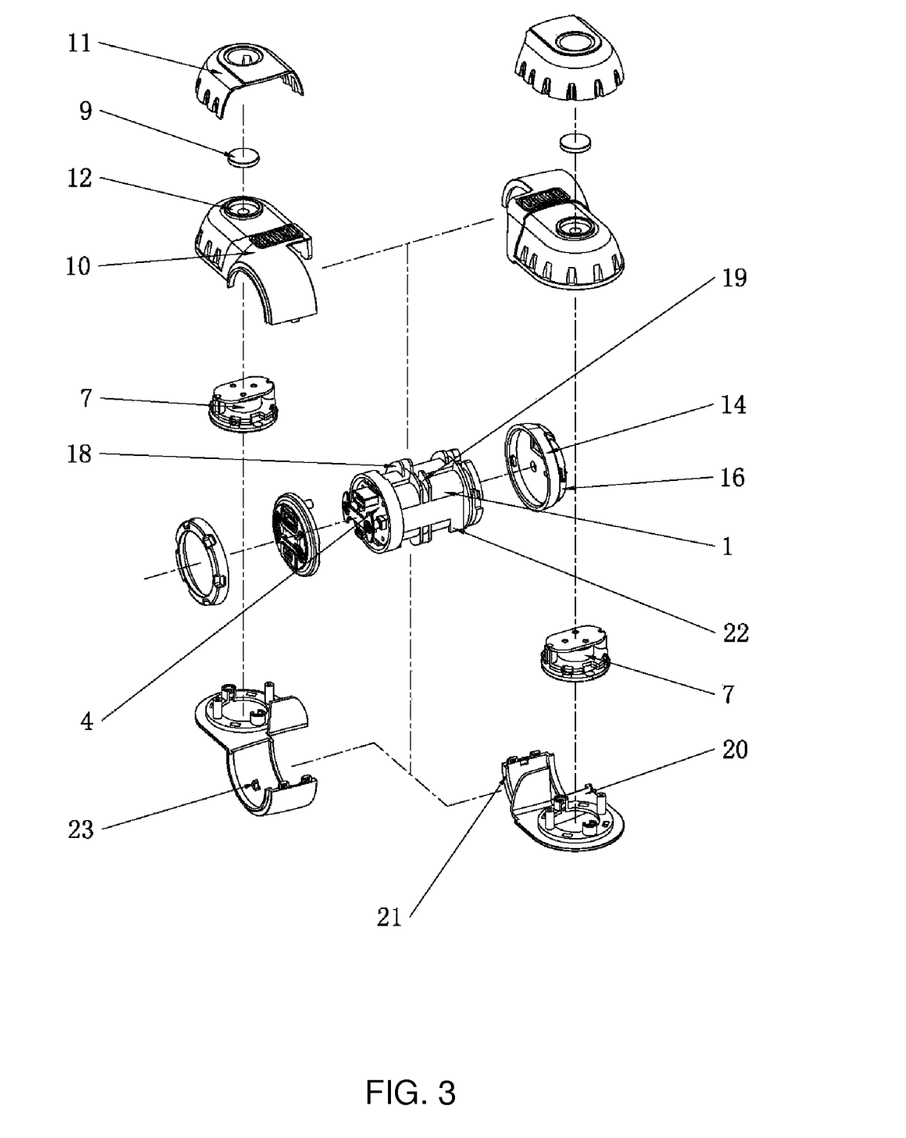
FIG. 3 is an exploded view of the vehicular charger of the present invention.
Figure 4:
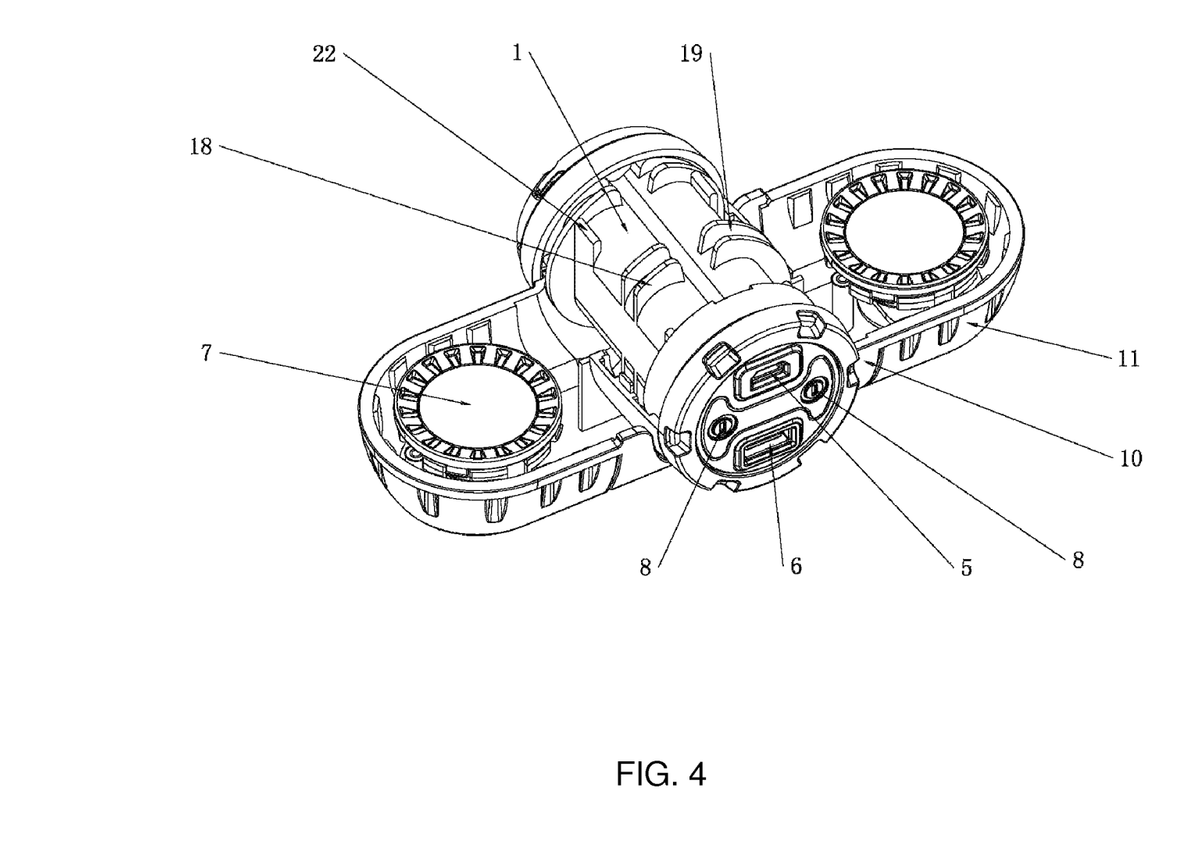
FIG. 4 is an internal structure diagram of the vehicular charger of the present invention.
Figure 5:
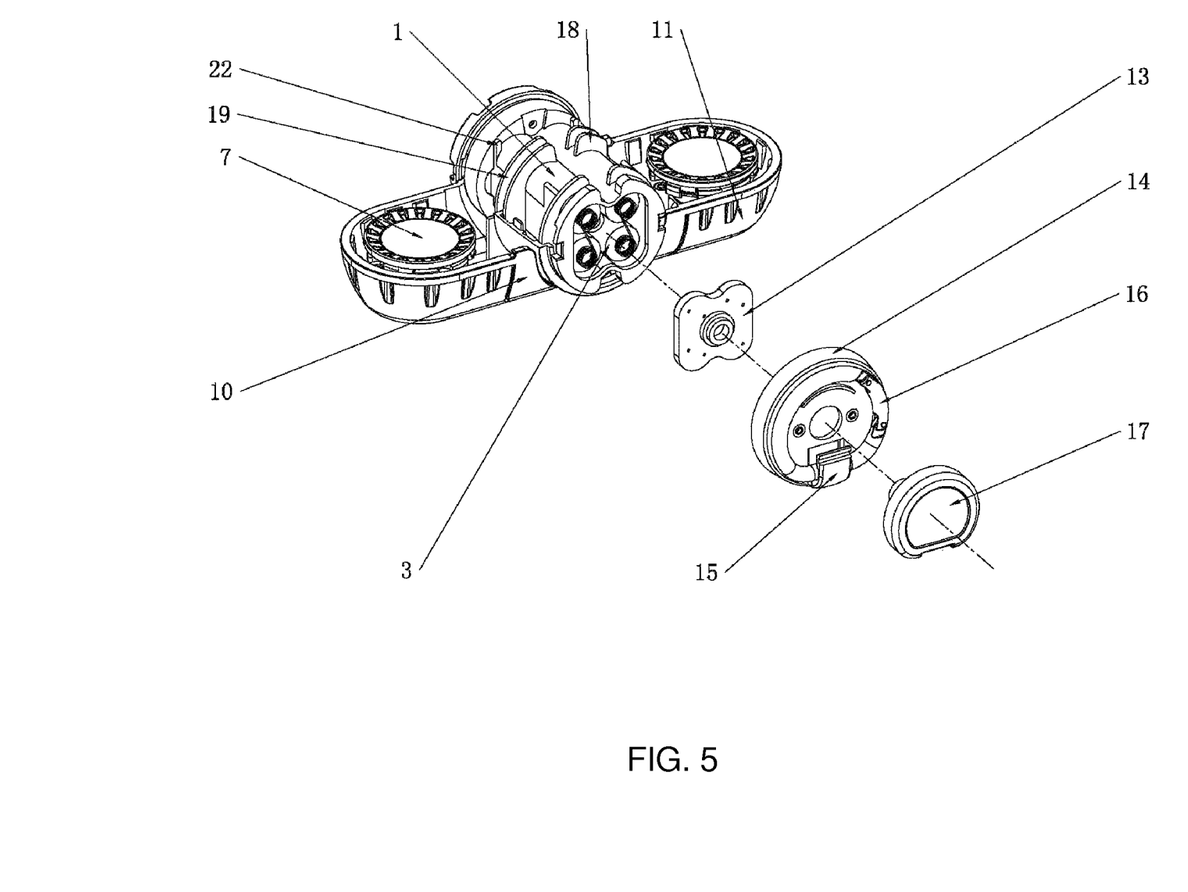
FIG. 5 is a local vehicular exploded view of the charger of the present invention.
Figure 6:
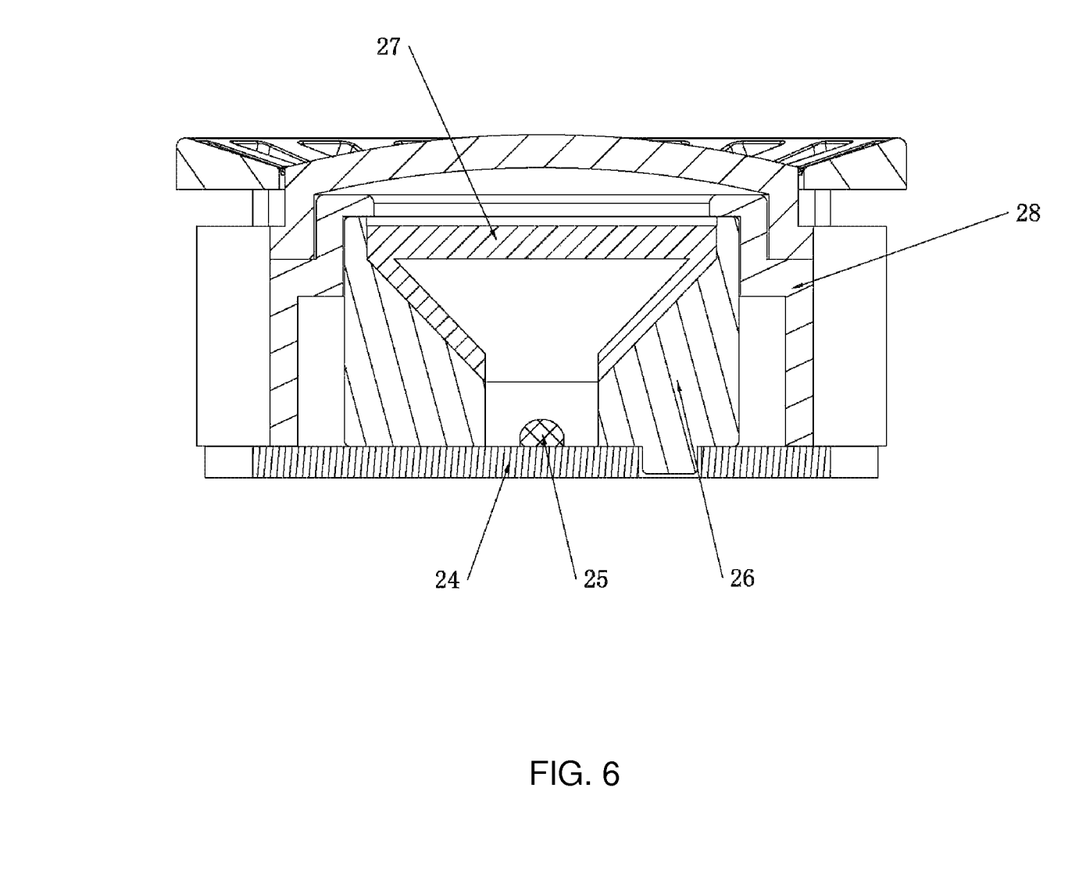
FIG. 6 is a sectional view of an illumination assembly of the present invention.
Figure 7:
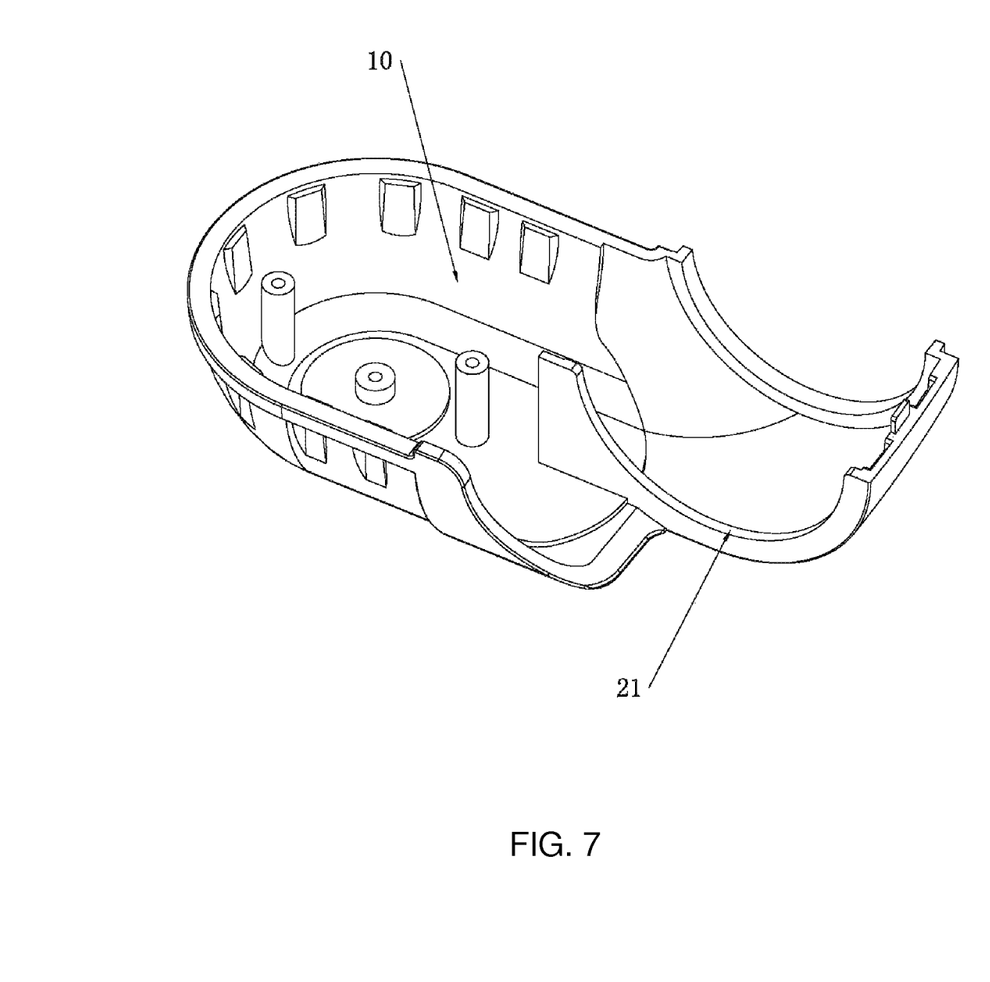
FIG. 7 is a structure diagram of the main body of the present invention.

Said illumination assembly 7 includes a substrate 24 and a LED light 25 arranged on the substrate 24, a light sleeve 26 on said substrate 24 (a transparent cover 27 is arranged inside the light sleeve 26); a bracket sleeve 28 on said substrate 24, said bracket sleeve 28 and said secondary casing body 2 are screwed to be fixed together; a light sleeve 26 mounted on the substrate 24 is light-tight; light emitted from the LED light 25 will almost all be irradiated onto the transparent cover 27; interior of the upper portion of said bracket sleeve 28 is of a step shape, and is pressed onto the light sleeve 26. A positioning protrusion is provided on the bottom face of the light sleeve 26; the substrate 24 is provided with a positioning hole corresponding to the positioning protrusion, and the bracket sleeve 28 securely push the light sleeve 26 against the substrate 24.

The above descriptions are only some preferred embodiments, and it should be pointed out that, as for a person skilled in the art, modifications and alternatives can be made without departing from the discipline of the invention, and such modifications and alternative also fall within the scope of the invention.

This invention discloses a vehicular charger, wherein, comprising a main casing body and a secondary casing body which is arranged on both radial side of the main casing body and is rotatable matched with the main casing body; a chargeable source part is provided inside said main casing body; a circuit board electrically connected to the chargeable source part is arranged on one end face of said main casing body; an interface is arranged on the circuit board; an illumination assembly is mounted inside said secondary casing body; the illumination assembly is charged by the chargeable source part; a switch for controlling the ON/OFF of the illumination assembly is provided on said circuit board; a magnet is mounted on said secondary casing body. It is not only suitable for being used at home, but also in office; and it also is suitable for being used during trip or out of office. Especially during outdoor travel, the user can use the buckle to carry the product of the present invention. Moreover, during night activities, the LED light can be used to illuminate, so as to bring convenience to the user. Further, the interface of the present invention includes a interface dedicated to charge the chargeable source part, and a USB interface for supplying other electronic devices.

I claim:

1. A vehicular charger, characterized in that it comprises a main casing body and a secondary casing body which is arranged on both radial sides of the main casing body and is rotatably matched with the main casing body; a chargeable source part is provided inside said main casing body; a circuit board electrically connected to the chargeable source part is arranged on one end face of said main casing body; an interface is arranged on the circuit board; an illumination assembly is mounted inside said secondary casing body; the illumination assembly is charged by the chargeable source part; a switch for controlling the ON/OFF of the illumination assembly is provided on said circuit board; a magnet is mounted on said secondary casing body.

2. A vehicular charger according to claim 1, further characterized in that: a terminal cover embedded into the main casing body is mounted on one end face of said main casing body; an outer cover clamped and fixed with the main casing body is arranged outside the terminal cover; one side of said outer cover is provided with an elastic L-shaped clamping arm integrated formed with said outer cover; a buckle clamped by the clamping arm is provided on the outer cover; a compressing cover clamped by the clamping arm is screwed and fixed on said outer cover; the compressing cover adjusts clamping force of the clamping arm.

3. A vehicular charger according to claim 1, further characterized in that: said secondary casing body includes a main body rotatable matched with the main casing body as well as an upper cover mounted on the main body; a mounting slot is provided on said main body; said magnet is arranged inside the mounting slot.

4. A vehicular charger according to claim 3, further characterized in that: said main casing body is provided with a guiding plate; the guiding plate surrounds on outer wall of the main casing body; said guiding plate is arranged in two layers with an interval along axial direction of the main casing body, and a guiding slot is formed between those two layers; a curved guiding block that is embedded into the guiding slot is provided on said main body; said main body makes rotation movements along the guiding slot.

5. A vehicular charger according to claim 4, further characterized in that: said secondary casing body also include a sealing cover which is clamped by and fixed to the main body; the sealing cover is also provided with a guiding block which rotates along the guiding slot; outer wall of said main casing body is provided with a limit plate; the limit plate is correspondingly arranged on outer walls on both sides of the main casing body; said sealing cover is provided with a limit block; the limit block is located between two corresponding limit plates; when the sealing cover rotates to a limited position, the limit block is put against the limit plate, and the limit plate stops the movement of the limit block.

6. A vehicular charger according to claim 1, further characterized in that: said illumination assembly includes a substrate and a LED light arranged on the substrate; a light sleeve on said substrate, a transparent cover is arranged inside the light sleeve; a bracket sleeve on said substrate, said bracket sleeve and said secondary casing body are screwed to be fixed together.

* * * * *